United States Patent [19]
Zappala et al.

[11] Patent Number: 5,467,690
[45] Date of Patent: Nov. 21, 1995

[54] MACHINE FOR PREPARING A COFFEE INFUSION IN PARTICULAR FOR HOME USE

[76] Inventors: Paolo Zappala; Biagia Tomasello, both of Via Rapisardi, 314, 95123 - Catania, Italy

[21] Appl. No.: 168,650

[22] Filed: Dec. 16, 1993

[30] Foreign Application Priority Data

Dec. 18, 1992 [IT] Italy ................................. MI92U1075

[51] Int. Cl.$^6$ .................................................. A47J 31/36
[52] U.S. Cl. ............................................ 99/302 P; 99/303
[58] Field of Search .......................... 99/282, 292, 293, 99/294, 297, 302 P, 302 R, 303, 295, 306; 426/433

[56] References Cited

U.S. PATENT DOCUMENTS

| | | | |
|---|---|---|---|
| 3,111,079 | 11/1963 | Lescure | 99/293 |
| 3,368,476 | 2/1968 | Mancioli | 99/303 |
| 4,498,375 | 2/1985 | Bedini | 99/303 |
| 4,557,187 | 12/1985 | Ponti | 99/293 |

*Primary Examiner*—Robert W. Jenkins
*Attorney, Agent, or Firm*—Bucknam and Archer

[57] ABSTRACT

An improved machine for preparing a coffee infusion, in particular for home use has an unique construction including a plurality of elements, i.e. a water boiling chamber, on the top of which can be threaded a coffee infusion collecting chamber, having a filter containing the coffee powder.

The machine is characterized in that, starting from the inside of the water boiling chamber and coaxially proceeding along a fitting cylindric element, there extends a hollow vertical cylinder in which a piston can be displaced, the piston causing in turn a given water amount to be displaced toward the filter.

7 Claims, 1 Drawing Sheet

MACHINE FOR PREPARING A COFFEE INFUSION IN PARTICULAR FOR HOME USE

BACKGROUND OF THE INVENTION

The present invention relates to an improved machine for preparing a coffee infusion, in particular for home use.

As is known, for preparing aromatic coffee infusions there are generally used coffee making machines, mainly designed for home use, which prepare the coffee infusion by means of boiling water caused to pass through a filter holding a coffee powder.

More specifically, these prior machines usually comprise a water boiling chamber, from which a given amount of water, which arrives at its boiling temperature of 100° C., is caused to upwardly rise so as to pass through a filter holding the coffee powders.

The liquid, obtained by the contact of the boiling water with the coffee powder, is then entrained through a conveying duct to enter a coffee infusion collecting chamber.

This represents the so-called coffee "extraction" method which, however, is affected by several drawbacks.

In fact, the high temperature of the boiling water causes the entrainment in the prepared coffee infusion, of wood-like substances, which are usually present in the coffee powder, and which are very noxious for the human body, as well as the development of high amounts of caffeine.

Moreover, the coffee making machines based on the above disclosed infusion preparing method provide a coffee infusion in which a great portion of the coffee flavour has been inevitably lost.

For partially overcoming the above mentioned problems, there are specifically designed, and are commercially available from several years, domestic use coffee making machines, the so-called "Naples" machines, which actually use, for making coffee beverages, an infusion method.

These latter coffee making machines, however, are rather complex with respect to the use procedure thereof, since it is necessary to perform several up-down tilting operations of the machines for causing hot water to fall so as to contact the powder coffee.

Moreover, in these machines, the time necessary for preparing the coffee infusion is comparatively long, much greater than that necessary for preparing coffee in the coffee making machines based on the extraction method.

SUMMARY OF THE INVENTION

Accordingly, the object of the present invention is to overcome the problems and drawbacks therein-above mentioned, by providing an improved coffee making machine which is adapted to prepare, by infusion, a coffee based beverage having a good flavour, and in which there are not present substances noxious to the human body and which, moreover, contains proper caffeine doses.

Within the scope of the above mentioned object, a main object of the present invention is to provide a domestic use coffee making machine which can be used by a simple method and which is adapted to prepare the coffee infusion in a short time.

Another object of the present invention is to provide such an improved coffee making machine which, owing to its construction features, is very reliable and safe in operation and can be easily made starting from easily commercially available elements and materials.

Yet another object of the present invention is to provide such a coffee machine machine which is furthermore very competitive from a mere economical standpoint.

According to one aspect of the present invention, the above mentioned objects, as well as yet other objects, which will become more apparent hereinafter, are achieved by an improved coffee making machine for preparing by infusion a coffee based beverage, said machine comprising an unique construction formed by a plurality of elements including a water boiling chamber, a prepared coffee beverage collecting chamber threaded above said water boiling chamber, said collecting chamber including a filter holding therein a coffee powder, characterized in that, starting from an inside of said water boiling chamber and coaxially advancing along a cylindrical fitting element, there extends a vertical hollow cylinder having vertical inside walls therebetween there is movably arranged a piston which, as is upwardly displaced, is adapted to displace a given water amount toward said filter.

BRIEF DESCRIPTION OF THE DRAWING

Further characteristics and advantages of the present invention will become more apparent hereinafter from the following detailed disclosure of a preferred, though not exclusive, embodiment of the subject improved coffee making machine which is illustrated, by way of an indicative, but not limitative example, in the figure of the accompanying drawing, in which.

DESCRIPTION OF THE PREFERRED EMBODIMENT

Figure 1:
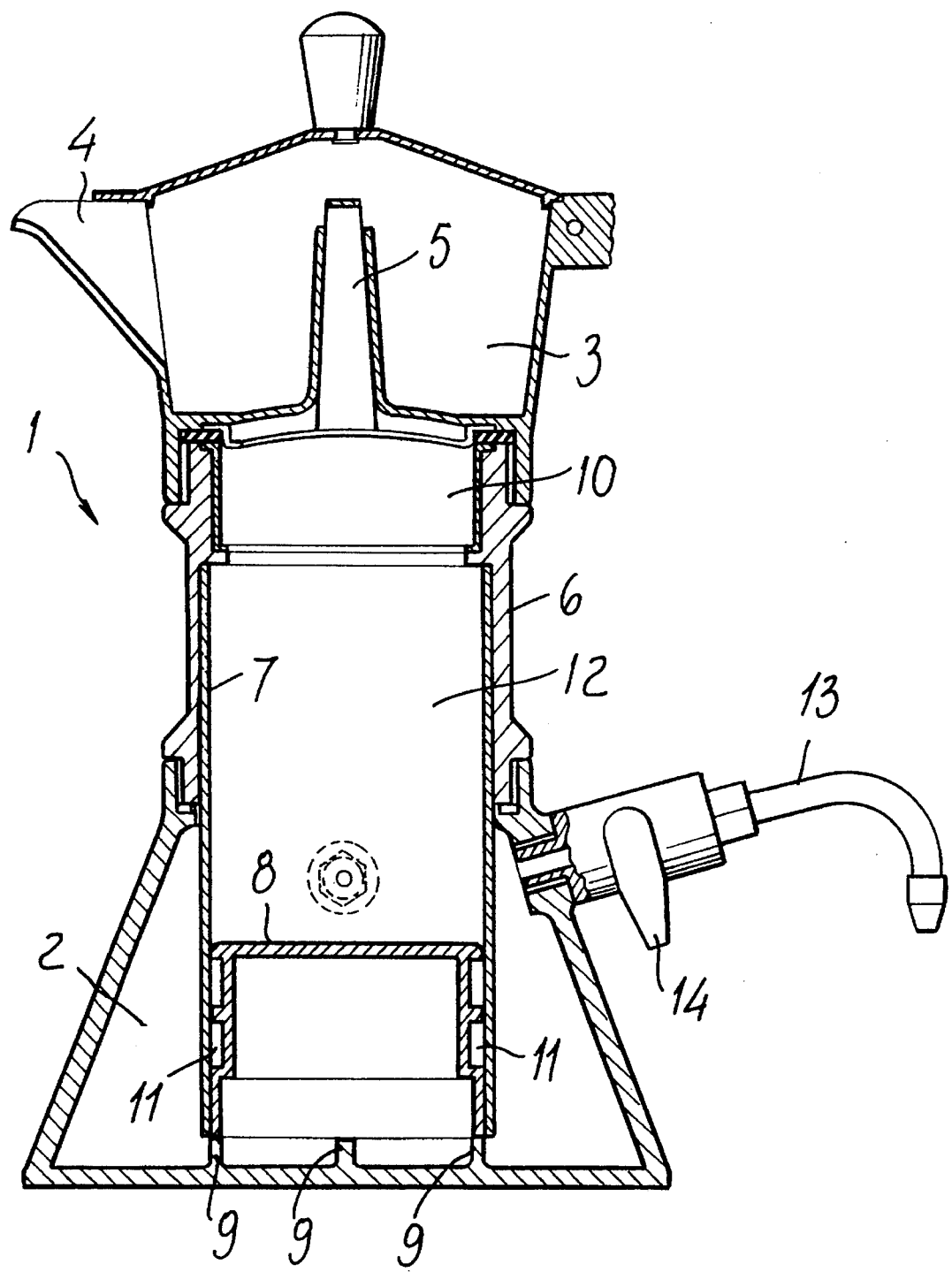
FIG. 1 is an overall front view, as cross-sectioned, of the improved coffee making machine according to the present invention, specifically designed for preparing by infusion a coffee based beverage.

With reference to the number references of the above mentioned figure, the improved coffee making machine, which has been specifically designed for preparing by infusion a coffee based beverage, according to the present invention, has been generally indicated at the reference number 1 and comprises a unique construction formed by a plurality of elements including a water boiling chamber 2, on the top of which there is threadably engaged a water collection chamber 3, having a suitable spout 4.

Inside the collection chamber 3 there is provided a channel element allowing the prepared coffee based beverage to be ejected therefrom.

The main feature of the present invention is that, starting from the inside of the chamber 2 and advancing coaxially along a cylindrical fitting element 6, there extends a hollow cylinder 7 having vertical inside walls therebetween can be upwardly displaced a piston 8.

More specifically, the fitting cylindric element 6 is threaded at the bottom to the chamber 2 and at the top thereof to the collecting chamber 3.

In particular, the hollow cylinder 7, as shown, is supported on suitable supporting pins 9, provided on the bottom of the chamber 2, so as to be arranged at a higher level than that of the mentioned bottom.

This allows the water held in the chamber 2 to circulate inside the cylinder 7 and, accordingly, also on the walls of the mentioned piston 8.

The top end portion of the cylinder 7 operates as a resting base for a filter 10 containing a ground coffee powder, and which is provided for engaging inside the above mentioned collecting chamber 3.

Said piston 8 comprises suitable recesses 11 for housing therein tightness gaskets.

The improved coffee making machine according to the invention operates as follows:

At the start, the chamber 2 as well as the compartment indicated at the reference number 12 are filled by water, said compartment being formed inside the hollow cylinder 7, more specifically between its side walls and the horizontal wall of the piston 8.

Then, the filter 10 is filled by ground coffee powder.

After having perfomed the above mentioned operations, the temperature of the water held in the chamber 2 is brought to 100° C., that is to its boiling temperature.

The water held in the compartment 12, which is laterally separated by the walls of the cylinder 7 and is separated at the bottom by the piston 8, is subjected to a heating process by convection from the underlaying boiling water, so as to achieve a temperature which can vary from 70° C. to 95° C.

The above temperature range is obtained depending on the thickness which can have the horizontal wall of the piston 8, depending on the models of the subject machine 1.

The boiling water held in the chamber 2 will generate steam, thereby providing a hydromechanical urging force on the piston 8 which will cause this piston 8 to be upwardly displaced.

Thus, the piston will cause the water held in the compartment 12, of less temperature, to be conveyed to the filter 10 holding therein the coffee powder.

Finally, the thus made mixture, as obtained by infusion of water at a temperature of 70°–95° C. with a coffee powder, is collected in the collection chamber 3, after having traversed the channel 5.

As shown, the improved coffee making machine 1 further preferably comprises a cock 13, of any suitable curved shape, allowing steam to be ejected therefrom, so as to provide a foam as necessary for preparing, for example, the so-called "espresso" coffee as well as a foamed coffee and milk mixture, that is the so-called "cappuccino".

The cock 13 includes a control lever 14 for opening and closing the cock itself.

From the above disclosure it should be apparent that the invention fully achieves the intended aim and objects.

In particular, the fact is to be pointed out that the coffee beverage made by the subject improved machine has very good qualities, such as flavour qualities, which are very satisfactory, since the produced beverage does not hold therein wood-like substances.

The invention as disclosed is susceptible to several variations and modifications all of which will come within the scope of the invention.

Moreover, all of the details can be replaced by other technically equivalent elements.

In practicing the invention, the used material, provided that they are compatible to the intended use, as well as the continget size, can be any depending on requirements.

We claim:

1. An improved coffee making machine for preparing by infusion a coffee based beverage, said machine comprising a construction formed by a plurality of elements including a water boiling chamber, a prepared coffee beverage collecting chamber mounted above said water boiling chamber, said collecting chamber having a bottom portion being adapted to receive a filter adapted to hold therein a coffee powder, wherein said water boiling chamber has a top portion to which is secured the bottom portion of a cylindrical fitting element having a top portion thereof secured to said bottom portion of said collecting chamger, inside said cylindrical fitting element there being coaxially arranged a vertical hollow cylinder having vertical inside walls encompassing a movable piston which, as is upwardly displaced, is adapted to displace a given water amount toward said filter.

2. The improved coffee making machine according to claim 1, wherein said piston has a horizontal wall and said water displaced by said piston, which, in turn, is displayed by a steam force generated by water boiling inside said boiling chamber, is held in a compartment formed inside said hollow cylinder, between the vertical wall thereof and said horizontal wall of said piston.

3. The improved coffee making machine according to claim 2, wherein said water held in said compartment has a temperature from 70° C. to 95° C.

4. The improved coffee making machine according to claim 1, wherein said boiling water chamber has a bottom portion and said cylinder is supported by a plurality of pin elements provided on said bottom portion of said water boiling chamber at a higher level than that of said bottom portion of said water boiling chamber.

5. The improved coffee making machine according to claim 1, wherein said hollow cylinder has a top end portion and said top end portion of said hollow cylinder is adapted to operate as a bearing base for said filter.

6. The improved coffee making machine according to claim 1, wherein said machine further comprises a curved cock allowing steam to be ejected therefrom.

7. The improved coffee making machine according to claim 6, wherein said cock is provided with a lever control for opening and closing said cock.

\* \* \* \* \*